ic Office 3,433,573
Patented Mar. 18, 1969

3,433,573
ETHYLENE/VINYL ACETATE POLYBLENDS WITH POLYMERS OF 1-OLEFINS
Harry P. Holladay and Ival O. Salyer, Dayton, Ohio, assignors to Monsanto Company, a corporation of Delaware
No Drawing. Filed Apr. 27, 1960, Ser. No. 24,872
U.S. Cl. 8—55                                    17 Claims
Int. Cl. C08f 29/12, 37/18

ABSTRACT OF THE DISCLOSURE

Compositions are disclosed comprising blends of 5 to 95% by weight of a propylene polymer containing a major amount of propylene and 95 to 5% by weight of a copolymer of ethylene with a polar monomer such as vinyl acetate, methyl methacrylate, vinylene carbonate, alkyl acrylates, vinyl halides and vinylidene halides. Suitable blends contain crystalline polypropylene and an ethylene-vinyl acetate copolymer. The compositions may be formed into fibers, films and molded articles of improved dyeability and low temperature characteristics.

---

The present invention is directed to polyblend compositions containing from 5% to 95% of the weight of the blend of an ethylene/vinyl acetate copolymer, and crystalline polymers obtained from 1-olefin monomers of from 3 to 8 carbon atoms, particularly polypropylene polymers.

Solid high molecular weight crystallizable polypropylene, prepared by the low pressure process, is characterized by properties that are dependent upon both its degree of crystallinity, and its environmental temperature. Thus, depending upon its crystalline content, polypropylene may range from a rigid brittle solid to a soft flexible rubber. However, regardless of its crystalline content and room temperature flexibility, unmodified polypropylene is brittle at temperatures below its glass transition (about 5° C.).

Although inferior to either high or low pressure polyethylene in its low temperature properties, polypropylene is greatly superior even to low pressure polyethylene in resistance to high temperatures (melting point about 176° C. v. 135° C.).

Within the purview of our instant invention we include polyblend compositions of polymers of alkyl 1-olefins of 3 to 8 carbon atoms with an ethylene/vinyl acetate copolymer wherein the composition contains from 5% to 95% by weight of the poly-1-olefin and correspondingly from 95% to 5% by weight of an ethylene/vinyl acetate polymer containing from 95% to 65% ethylene with the balance being vinyl acetate.

It is an object of this invention to prepare polypropylene compositions having improved flexibility and toughness at both room temperature and below 0° C. while retaining a large measure of its high temperature properties.

The properties of low pressure polypropylene are to a considerable extent due to its substantially regular or stereospecific arrangement of side chain groups which permit the polymer to exist in crystalline form. If polypropylene chains have the methyl side groups occurring at random on either side of the chain, the polymer is said to be atactic; and when the side groups all lie on one side of the chain, the polymer is said to be isotactic. When the methyl side chain groups alternate regularly from one side to the other, in an ordered DL-steric configuration, the polymer is said to be syndiotactic. Either isotactic or syndiotactic polypropylene, (stereospecific or stereoregular polypropylene) can be used in the practice of this invention.

Polypropylene of high isotactic content is brittle upon impact at room temperature and below. When the whole polymer contains an appreciable content of atactic material, e.g., about 10% or more, it has good toughness at room temperature, but still becomes undesirably brittle at the glass transition of the rubber phase, which is about 5° C. An introduction of controlled percentages of atactic polypropylene into othe isotactic polypropylene thus does not give the low temperature properties desired, and in addition, the high temperature properties are adversely affected by increased atactic polymer content. Representative low pressure polypropylene of relatively high isotacticity has the following properties.

Tensile properties (ASTM D–638–56T):

| | |
|---|---|
| Strength—yield p.s.i. | 4920 |
| Strength—break p.s.i. | 2980 |
| Percent Elongation—yield | 14 |
| Percent Elongation—break | 320 |
| Impact strength[1] | 0.68 |
| Melt index (220° C.)[2] | 0.98 |
| Clash-Berg Modulus data[3] (ASTM–D 1043–51): | |
| $T_f$ Modulus, 135,000 p.s.i., ° C. | 42 |
| $T_{2000}$ Modulus, 2000 p.s.i., ° C. | 158 |
| Stifflex Range | 116 |
| 25° Modulus p.s.i. | 205,000 |
| Brittleness temperature (ASTM–D 746–55T) | |
| (50% failure) °C. | 15 to 25 |

[1] Determined by the Notch Izod Impact Test, values reported are (ft.-lb./in. Notch), ASTM–D 256–56.
[2] The weight of material in grams which flows out through a hole 0.0825 inch in diameter and 0.315 inch in length, under a load of 2160 grams in 10 minutes, ASTM–D 1238–52T.
[3] The Clash-Berg Modulus data gives information of the torsional stiffness of the polymer as related to temperature. The $T_f$ value is the temperature at which the polymer just begins to have some slight degree of flexibility; and the $T_{2000}$ is the temperature at which the material becomes very rubbery and non-load bearing. The Stifflex Range ($T_f$–$T_{2000}$) represents the temperature range over which the polymer is reasonably tough, i.e., high in impact strength, and at the same time rigid enough to bear some load. The value of the 25° modulus is determined to provide a further indication of the torsional modulus at approximately room temperature.

It can be seen from these data, the polypropylene has exceptionally high tensile strength at room temperature, and is suitable for use at high temperatures (as indicated by its high $T_{2000}$); however, it is apparent that the polypropylene is inferior for use at low temperatures, as indicated by its $T_f$ well above room temperature, and similarly by its brittleness temperature only very slightly below room temperature. It is an object of the present invention to extend the useful temperature range downward to obtain desirable and useful characteristics at low temperatures, while still retaining the useful high temperature properties of the polypropylene. It is a further object to prepare a polymer composition having improved and more useful low temperature properties than isotactic polypropylene.

Another object of this invention is to prepare blends of polypropylene with ethylene/vinyl acetate copolymer wherein said blends have a broader Stifflex Range than isotactic polypropylene. Blends containing 5 to 95% polypropylene and correspondingly, from 5 to 95% ethylene/vinyl acetate copolymer are included within the broad scope of this invention, percentages being expressed as weight percents of the ultimate blend. When polypropylene containing a relatively low crystalline content is used to prepare the blends of this invention, from 10 to 50% of the blend comprises the ethylene/vinyl acetate copolymer. A preferable range of compositions is prepared by blending from 20 to 40% of an ethylene/ vinyl acetate copolymer with from 80 to 60% of low crystalline content polypropylene. By this means, low modulus rubbery products of excellent flexibility and toughness at both room temperature and below 0° C. are produced. The products are valuable wherever rubbery materials having low modulus properties are desired.

On the other hand, when comparatively high crystallinity polypropylene is blended with an ethylene/vinyl acetate copolymer, we can employ from 5 to about 95% based on the weight of the blend, of the copolymer. Optimum low temperature properties are obtained when the ethylene/vinyl acetate copolymer content is within the range of 50 to 90% preferably between 70 to 90%. In this case, use of the preferred percentages of ethylene/vinyl acetate copolymer results in compositions having a combination of rigidity and toughness at both room temperature and below 0° C. Thus, it is seen that, depending upon the choice of atactic content in the starting polypropylene, products of distinctly different character useful for different types of applications can be made.

We have discovered that compositions for low modulus applications, e.g., transparent films for wrapping and packaging purposes, shower curtains, etc., can be prepared by blending a rubbery ethylene/vinyl acetate copolymer with polypropylene having a comparatively low isotactic polymer content, say about 60% or less. When polymer having comparatively high isotactic content, say about 80% or more, as determined by n-heptane extraction, is blended with ethylene/vinyl acetate copolymer the product compositions are particularly suitable for injection moldings, blown films, etc. These moldings and films have unexpected, high gloss properties, good heat resistance, and vastly improved low temperature impact strength and brittleness properties when compared with polypropylene per se.

Within the scope of the present invention we include blends of crystalline polypropylene with a copolymer consisting of about 95% to 60% ethylene and correspondingly about 5% to 40% vinyl acetate. Optimum physical property improvement is found when the copolymer component of our new blends consists of 70% to 90% ethylene and correspondingly from 30% to 10% vinyl acetate.

This invention is applicable not only to homopolymers of propylene, but to normally solid polypropylene type materials which are copolymers of propylene with another monomer wherein a major proportion of the copolymer is composed of propylene.

The ethylene/vinyl acetate interpolymers used in the practice of our invention preferably have at least about 5% by weight vinyl acetate, esp. of about 5–35% by weight vinyl acetate, and more preferably 10–25% by weight vinyl acetate with the balance of the copolymer being ethylene. At these ranges of vinyl acetate content in the ethylene/vinyl acetate copolymer appreciable crystallinity is present. A significant factor in the selection of these particular ethylene/vinyl acetate copolymers is that the copolymer has increased resistance to extraction by solvents at temperatures below the melting point of the copolymer, and has the proper compatibility for polyblend augmentation of physical properties. These ethylene/vinyl acetate copolymers have some useful properties as such, but when blended with low pressure polypropylene, as taught herein, compositions are obtained having totally unexpected low temperature brittleness properties without sacrificing the high temperature properties of the polypropylene.

While our invention has been described herein with particular reference to ethylene/vinyl acetate copolymers, we have found that ethylene copolymers with other polar monomers are suitable. The particular requirement, for incorporation in our compositions, is that the ethylene copolymer contain at least a significant amount of crystallinity as measured by X-ray diffraction technique. Examples of usable ethylene copolymers include ethylene/methyl methacrylate, ethylene/vinylene carbonate, ethylene/vinylidene chlorofluoride, ethylene/vinyl chloride, ethylene/vinyl fluoride, ethylene/vinylidene fluoride and ethylene/alkyl acrylate copolymers. These copolymers can also be used to replace a corresponding part by weight of the ethylene/vinyl acetate copolymer in preparing our novel blends.

For the preparation of the compositions of our present invention, we prefer to use a solid polymer of crystallizable propylene produced by the low pressure polymerization process. Suitable polypropylene for use in this invention will have viscosity average molecular weight ($M_v$) of 50,000 to 600,000, or preferably 100,000 to 400,000. These values correspond to intrinsic viscosities [$\eta$] in Decalin at 135° C. of 0.5–5.0 for the broad range, and intrinsic viscosities of 1.0–3.0 for the narrow range. The intrinsic viscosities of polypropylene are related to the viscosity molecular weight by the relation:

$$[\eta]=1.00\times10^{-4}M_v^{0.8}$$

The method for relating the intrinsic viscosity to the molecular weight is described in an article by R. Chaing, J. Polymer Sci. 28, 235 (1958). However, molecular weight slightly lower or higher than these limits can also be useful in the practice of this invention.

In terms of molecular weights calculated on the basis of intrinsic viscosity, the preferred ethylene/vinyl acetate copolymers suitable for the practice of our invention will ordinarily have weight average molecular weight ($M_w$) of at least 50,000 to 200,000 or more although somewhat lower molecular weight copolymers, such as those of 15,000 or 20,000 may also be used; it is also possible to employ such copolymers in higher molecular weights, up to 500,000 or greater.

The numerically designated molecular weights referred to can be determined in a conventional manner on the basis of the intrinsic viscosities of the polymer in xylene solution as described in the above reference. The intrinsic viscosity is converted to molecular weight by means of the equation $$[\eta]=1.05\times10^{-3}\ M_w^{0.63}$$

By this calculation the ethylene/vinyl acetate copolymer referred to above would include those having intrinsic viscosities from 0.5 to 5.0. Converted to molecular weight, these intrinsic viscosities include broadly polymers of 18,000 to 700,000 molecular weight.

The long chain branching, normally present in high pressure ethylene polymers and copolymers, markedly effects the solution properties of the ethylene/vinyl acetate copolymer and thereby the intrinsic viscosity/molecular weight relationship. The amount of this long chain branching increases with the molecular weight of the product, with a significant change in the intrinsic viscosity molecular weight relationships being observed at a molecular weight of about 100,000 ([$\eta$]=1.15). Accordingly, two separate equations will give a more accurate representation of the molecular weight of ethylene/vinyl acetate polymer, than the reference method cited above, as follows:

(1) For [$\eta$] viscosity below 1.15, [$\eta$]=$1.74\times10^{-3}$ $M_w^{0.56}$.

(2) For [$\eta$] viscosity above 1.15, [$\eta$]=$0.153\times M_w^{0.17}$.

In terms of number average molecular weights ($M_N$), calculated from osmotic pressure measurements, the ethylene/vinyl acetate copolymers employed will ordinarily have molecular weights of at least 10,000 to 60,000 or more, although somewhat lower molecular weights, such as those of 5,000 to 10,000 may also be employed; it is also possible to employ such copolymers of high molecular weight, up to 100,000 or greater.

In general, it can be said that such copolymers will have number average molecular weights varying from about one-half that of commercial high pressure polyethylene up to about double that of commercial high pressure polyethylene.

The invention in its broadest aspects is not departed from by incorporating into the ethylene/vinyl acetate interpolymer other monomeric materials capable of entering into the polymerization reaction. It is preferred, however, to employ copolymers consisting of, or consisting essentially of, ethylene and vinyl acetate copolymerizate.

The polyblend compositions of the present invention can be utilized as prepared or in addition they can be subjected to a curing step. Both the composition before curing and after curing are considered within the scope of the present invention. The compositions are generally cured by peroxides, or by other organic compounds capable of generating free radicals when heated below 200° C. Thus, in addition to the diacyl peroxides, including dicumyl peroxide, benzoyl peroxide and lauroyl peroxide, which are highly effective as curing agents, the following materials may also be used: substances, such as oxygen which react with organic materials to form organic peroxide, dialkyl peroxides such as diethyl peroxide, ditertiary butyl peroxide, diisopropyl peroxide; hydroperoxides such as hydroxymethyl hydroperoxide, tertiary butyl hydroperoxide, ethyl hydroperoxide, etc.; peracids, such as acetoperacid, benzoperacid, succinic monoperacid, phthalic peracid, trimethyl acetoperacid; peresters, exemplified by ethyl percamphorate, or esters of perbenzoic acid such as ethyl perbenzoate or tertiary butyl perbenzoate, compounds containing an

grouping, particularly the organic N-chloro derivatives of amines or amides such as chloramine T, dichloroamine T, or chloramine B (sodium-N-chlorobenzene-sulfoamide); metal alkyl derivatives, such as lead tetraethyl or lead diethyl dibromide; amine oxides such as triethylamine oxide; hydrazine salts and derivatives such as hydrazine hydrate, hydrazine hydrochloride, hydrazine sebacate or benzoyl hydrazine; amino compounds, such as diphenyl ketazine, aldazines, etc. As a rule, it is preferable to select a curing agent that is relatively stable below about 100° C. and substantially nonvolatile at temperatures encountered during curing.

It will be appreciated that curing can be accomplished by radiation as well as by chemical means if desired. Curing by radiation eliminates the problem or undesirable residue in the cured product resulting from the use of certain chemical curing agents. Another advantage of radiation is that it is exceptionally fast in comparison to many of the chemical curing agents.

The ethylene/vinyl acetate interpolymer suitable for the practice of our invention has a crystallinity content from about 5 to 35% as determined by X-ray diffraction techniques. The interpolymer containing from about 5 to 35% vinyl acetate, which corresponds to 1.7 to 14.9 mol percent vinyl acetate, are particularly useful in our novel polyblending application. These interpolymers can be conveniently prepared by the copolymerization of ethylene and vinyl acetate in the presence of oxygen or a peroxy catalyst.

Generally two polymeric materials, even though rather closely related as to molecular structure and molecular weight, are not completely compatible. Incompatability manifests itself in a number of ways. Thus, when films are formed from the mixture of polymers, the incompatibility of the polymers may be shown by opacity of the film or by the presence of isolated islands or pock marks of one polymer caused by separation of components in an otherwise clear film. Molded articles made from an incompatible mixture of polymers are generally opaque or if translucent become white very readily on repeated flexing. Incompatible polymer systems, particularly when subjected to injection moldings, but also when compression molded or extruded, often appear to undergo a phase separation at the surface believed to be caused by the high-melting-point component solidifying first on contact with a cold mold. This results in a heterogeneous surface. The surface then has poor gloss which is a definite commercial drawback.

Polymeric systems, wherein two or more polymers are completely compatible with each other, (solid solutions) have the important advantage of clarity, that is to say the polymer in any form, e.g., film, molding, or extrusion is perfectly clear and transparent. However, these completely compatible (soluble) polymer mixtures have the disadvantage that the softening point (melting point or glass transition) of the higher melting component is unduly lowered by the presence of the soluble component. Furthermore, in a rigid brittle polymer, a relatively large proportion (up to 60% or more) of the soluble rubbery component is necessary in order to impart toughness at room temperature and below. Also, in this instance, the toughness is obtained at a sacrifice in rigidity, and is thus achieved only when the materials become low in modulus at room temperature.

In between the extremes of completely compatible polymer blends, and incompatible polymer mixtures unusual combinations of toughness with rigidity and flexibility without loss in heat resistance can be obtained by proper control of degree of incompatibility, but such augmentation of physical properties is very rare and unusual.

When the degree of incompatibility is thus precisely controlled, it is possible to achieve polyblends with a fair degree of clarity, that is to say the polymer in any form, e.g., film, molding or extrusion is transparent to lightly translucent. These limitedly incompatible polyblends have the added advantage of giving in the molding or extruded product, a high surface gloss.

The polyblends of this invention, particularly the ethylene/vinyl acetate blends with polypropylene having a high crystalline content, are characterized by both excellent gloss and toughness of injection moldings.

Our new polyblends can be used in the preparation of fibers, films, and moldings. A particular advantage in the use of these compositions for the preparation of fibers is that the fibers are readily dyeable with acetate type dyes. Blown films prepared from these compositions are obtained having a high degree of clarity but unusual surface effects such as a pearlescent appearance can be obtained by biaxially orienting the blown film under specific temperature conditions.

The compositions of our invention can be prepared by blending the polymer components by any suitable means such as in a Banbury mixer, extruder, or on a roll mill. If a Banbury type mixer is employed, all the components of the composition can be charged to the mixer at one time and mixed at a temperature sufficient to prepare a homogeneous blend. In some cases, necessary heat for mixing may be supplied partly or wholly by the mechanical heat generated by the intensive mixing. After a mixing period of about 5 minutes, cooling water is circulated around the mixer, and the mixing speed is reduced so that the blend is reduced to a powder, which is then extruded one or more times through an extruder.

In accordance with one embodiment of the invention, a mixture of polypropylene and rubbery ethylene/vinyl acetate copolymer is prepared by milling the two polymers together on a conventional heated 2-roll mill under conditions which do not result in degradation of the polymers but form an intimate admixture of the two materials. The resulting composition of matter is an intimate, relatively clear, limitedly-incompatible polyblend.

Generally, a temperature about 185° C. to about 200° C. is high enough for milling the compositions and in some instances, lower temperatures are suitable. Any milling temperature up to approximately 250° C. which will give a homogeneous blend of the materials can be employed.

The practice of our invention is not to be limited to polyblends of ethylene/vinyl acetate copolymer with polypropylene homopolymer. Within the broad scope of our invention, we have found that polyblends having highly improved properties can be prepared from ethylene/vinyl acetate copolymer blended with propylene copolymer containing propylene as the major constituent. We prefer to practice our invention with ethylene copolymers that are characterized by the presence of at least a significant amount of crystallinity as determined by X-ray diffraction technique. We have found that beneficial properties can be obtained in polyblends of ethylene/vinyl acetate with propylene copolymers of olefins containing up to about 10 carbon atoms, and also with other propylene copolymers containing a significant amount of crystallinity, such as propylene copolymers with small amounts of maleic anhydride, acrylonitrile, alkyl vinyl ethers, alkyl esters of acrylic acid, and alkyl esters of methacrylic acid. When ethylene/vinyl acetate polymers are blended with propylene copolymers, it will be understood that the major portion of monomer in the propylene copolymer consists of propylene.

In the practice of our invention we can use, in place of part, or all, of the polypropylene, polymer prepared from hydrocarbon olefins of 4 or more carbon atoms, e.g., polybutene-1, poly-3-methylpentene-1, polypentene-1, poly-3-methylhexene-1, poly-4-methylhexene-1, poly-3,3-dimethylbutene-1, poly-4,4-dimethylpentene-1, polyhexene-1, poly-3-methylbutene-1, poly-5-methylhexene-1, poly-4-methylpentene-1, polyheptene-1, and polyoctene-1.

We have found, for example, that polyblends of ethylene/vinyl acetate copolymer with polybutene-1 are especially useful in the manufacture of molded plastic articles as the compositions have excellent heat resistance and very good low temperature characteristics and also have outstanding surface properties, i.e., gloss.

While we do not wish to be limited to any theory, one explanation can be advanced for the totally unexpected but highly desirable properties of these new polyblends. In the preparation of our novel polyblends we subject two polymeric materials, each of which is known to be shear sensitive, to shearing forces under conditions that are conducive to subsequent formation of graft polymers. Thus, while we refer to these compositions as polyblends, we may actually have compositions containing substantial proportions of graft polymer.

There can also be incorporated into the resulting polyblend either after it has been prepared by milling or while the intermixing of the two polymers is being accomplished, any of the usual fillers, pigments, plasticizers, dyes, antioxidants, stabilizers, and other materials that are customarily incorporated in plastics for various purposes. If desired, free-radical liberating materials, e.g., dicumyl peroxide, can be incorporated into the polyblend and thereafter the composition cross-linked by a heating step. Alternatively, shaped or formed articles can be treated with a high energy electron beam to induce a controlled amount of cross-linking.

A limitedly-incompatible blend of polypropylene and rubbery ethylene/vinyl acetate copolymer, either with or without added materials, can be formed into useful shapes or articles by known means. Thus, it can be subjected to injection molding or extrusion into tubes, films, filaments, and the like. Conditions and methods for accomplishing all of these procedures are so well known that it would be superfluous to describe them in detail here. As has been pointed out, resulting products will have a high surface gloss. Furthermore, in the absence of opaque fillers, such as pigments, extenders, etc., the articles of manufacture are relatively transparent.

Polypropylene useful in the preparation of our novel polyblends is commonly known as low pressure polypropylene. Suitable polymer is prepared at comparatively mild temperatures, say at or below about 150° C. and at pressures less than 100 atm. Polypropylene prepared according to the process of Italian Patents 535,712 and 549,915 or Belgian Patents 530,617, 538,782 and 558,563, disclosures of which are incorporated herein by reference, can be used in our novel polyblends.

Examples of suitable catalyst systems for the preparation of polypropylene for the practice of this invention are as follows: (1) an aluminum trialkyl and a Group IV–B to Group VI–B metal halide; (2) an organic halide, a Group IV inorganic halide, and a low valence metal selected from the group consisting of alkali metals, beryllium, magnesium, zinc, cadmium, mercury, aluminum, gallium, indium, and thallium; (3) chromium oxide on a silica-alumina support wherein a substantial part of the chromium is hexavalent; (4) a tri- or tetrahalide of titanium, zirconium, vanadium, or chromium, and an aluminum trialkyl or an aluminum dialkyl halide; (5) a compound of zirconium, vanadium, chromium, or titanium wherein the metal has a valence of 4 or less together with a reducing agent selected from the group consisting of Grignard reagents, alkali metal aluminum tetraalkyls, lithium hydrocarbons, tin tetraalkyls, and cadmium dialkyls; (6) a supported Group VI–B metal oxide usually pre-reduced with reducing gases at elevated temperatures or activated by treatment with metal alkyls, lithium aluminum hydride and the like.

The crystalline content of the polypropylene is commonly understood to be that part of the polymer that is insoluble in boiling normal heptane. The determination of the crystalline content is made by submitting a weighed sample of the purified, dry, whole polymer to an extraction process using n-heptane solvent. For example, the polypropylene described as having a crystalline content of 85% will have 15% of its weight extracted by refluxing normal heptane.

In our work on these compositions containing crystalline polypropylene and ethylene/vinyl acetate copolymers a great many different runs have been made. Certain representative data are set forth in the following tables and examples which present certain properties of selected materials, but these are set forth for the purpose of more fully describing the present invention and should not be considered to limit the invention to the specific details shown.

Example 1

A representative sample of a comparatively high crystallinity, high density, low pressure process polypropylene having of a density 0.903–0.906, marketed under the trade name "Pro-Fax" was used to prepare a series of polyblends of ethylene/vinyl acetate interpolymer using a Banbury type mixer followed by an extrusion apparatus. After two passes through the extruder, the compositions were compression molded on a heated mold into a slab of appropriate thickness, and test specimens were then die cut using standard dies. The die cut specimens were conditioned for at least 48 hours at 25° C. at 50% relative humidity before being evaluated.

We have now found that by varying the proportions of the ethylene/vinyl acetate copolymer that we can obtain totally unexpected improvements in selected properties of the propylene polymer. The data in the following tables show that the Stifflex Range can be broadened, the tensile strength and tensile elongation can be modified favorably, the impact strength can be increased to unexpected high levels and the low temperature brittleness properties can be improved and further that all of these improvements can be made without sacrificing the desirable high temperature properties of the 100% solid polypropylene.

TABLE 1A

| Composition | Stifflex Range |
|---|---|
| Control, 100% Pro-Fax | 117.0 |
| 50% Pro-Fax, 50% (85% ethylene/15% vinyl acetate) copolymer | 136.0 |
| 70% Pro-Fax, 30% (80% ethylene/20% vinyl acetate) copolymer | 128.0 |
| 50% Pro-Fax, 50% (80% ethylene/20% vinyl acetate) copolymer | 144.0 |
| 70% Pro-Fax, 30% (57% ethylene/43% vinyl acetate) copolymer | 138.0 |
| 50% Pro-Fax, 50% (57% ethylene/43% vinyl acetate) copolymer | 140.0 |

The Stifflex Range represents the temperature range, as determined by the Clash-Berg modulus test, over which the polymer is reasonably tough, that is, high in impact strength, and at the same time rigid enough to bear some load. This table indicates how the practice of our invention enables one to extend the usable temperature range of solid polypropylene.

is decreased from the maximum theoretically obtainable. On the other hand, we have now found that polyblends of ethylene/vinyl acetate copolymers with normally solid propylene polymers retain substantially the high melting point of the rigid polypropylene component but have desirable toughness properties and excellent low temperature properties.

TABLE 1B

| Composition | Tensile Properties | |
|---|---|---|
| | Strength yld./fail., percent | Elongation yld./fail., percent |
| Control, 100% Pro-Fax | /5,153 | /9 |
| 30% Pro-Fax, 70% (85% ethylene/15% vinyl acetate) copolymer | 1,602/3,795 | 30/783 |
| 10% Pro-Fax, 90% (85% ethylene/15% vinyl acetate) copolymer | 884/3,599 | 20/850 |
| 90% Pro-Fax, 10% (80% ethylene/20% vinyl acetate) copolymer | 4,337/2,711 | 10/195 |
| 90% Pro-Fax, 10% (70% ethylene/30% vinyl acetate) copolymer | 4,137/2,574 | 8/168 |

The tensile properties tabulated above, namely, the tensile strength and percent elongation, were determined by the use of ASTM-D method 638-56T.

Table 1C shows the unexpected high level of improvement in impact strength possessed by the compositions prepared according to our invention.

TABLE 1C

| Composition | Izod Impact Strength ft., lb./in. Notch |
|---|---|
| Control, 100% Pro-Fax | 0.87 |
| 30% Pro-Fax, 70% (85% ethylene/15% vinyl acetate) copolymer | [1] 8.26 |
| 20% Pro-Fax, 80% (85% ethylene/15% vinyl acetate) copolymer | [1] 6.88 |
| 10% Pro-Fax, 90% (85% ethylene/15% vinyl acetate) copolymer | [1] 5.93 |

[1] No break.

Table 1B indicates how the modulus properties of our novel polyblends can be varied by incorporating within the blend various proportions of ethylene/vinyl acetate copolymer.

The modulus properties of a polymeric material can

Table 1D which follows, further illustrates the surprising improvement in low temperature brittleness properties of the compositions of our invention which are obtained without sacrifice in the zero-tensile property of the composition.

TABLE 1D

| Composition | Low Temperature Brittleness | Zero-Tensile,° C. |
|---|---|---|
| Control, 100% Pro-Fax | 100% Break, 25° C | Break, 170° C. |
| 30% Pro-Fax, 70% (85% ethylene/15% vinyl acetate) copolymer | 50% Break, −44° C | Break, 167° C. |
| 30% Pro-Fax, 70% (80% ethylene/20% vinyl acetate) copolymer | 50% Break, −75° C | Break, 163° C. |
| 30% Pro-Fax, 70% (57% ethylene/43% vinyl acetate) copolymer | 50% break, −63° C | Break, 161° C. | be used to measure the ability of the material to absorb energy of deformation. In the case of homogeneous polymers, it has been generally found that the products having a high stiffness modulus generally have low impact strength. It is recognized in the art that the modulus of a given polymer can be varied by varying polymerization techniques. This procedure is necessary to obtain a polymer having specific properties for a particular end use. Propylene can be copolymerized with other monomers to prepare products having a reduced modulus and also reduced crystalline polymer content. However, this method of producing lower modulus products has a disadvantage, for many applications, in that the melting point of the resulting copolymer is considerably lower. This procedure is not applicable to polymer intended for molding, film, and fiber applications where a significant level of crystallinity and modulus is necessary. Polypropylene prepared by the low pressure process, is characterized by generally high crystalline content and high modulus property which leads to undesirable brittleness properties.

General methods of controlling and/or varying the modulus of a propylene polymer by increasing or decreasing the crystallinity, generally results in a corresponding reduction of the product melting point as the crystallinity The test specimens were subjected to the low temperature brittleness test as described in ASTM-D 746-55T using the Tinius-Olsen brittleness testing machine. This test measures the temperature at which plastics exhibit brittle failure under impact, when the impact is produced at the temperature specified and using a linear velocity of a striking edge of 6.5 ft. per second. The data can be expressed as a percentage of the specimens failing at a specific temperature, or as the temperature at which 50% of the specimens fail.

Example 2

A highly crystalline solid polypropylene manufactured in Italy by the low pressure process, having a density of 0.901–0.904, and imported under the trade name "Moplen" was used to prepare a series of polyblends of ethylene/vinyl acetate copolymer. The compositions obtained exhibited exceptionally broad Stifflex Range, highly improved impact strength and improved low temperature properties without sacrifice of the high temperature properties of the starting polypropylene. Evaluation data obtained from the compression molded specimens are included in the following table.

TABLE 2A

| Composition: | Stifflex Range, ° C. | Impact Strength, ft.-lb./in. Notch | Zero Tensile Strength |
|---|---|---|---|
| a | 93.0 | 0.84 | Break, 174° C. |
| b | 128.0 | 2.31 | Break, 172° C. |
| c | 124.0 | 2.54 | Break, 172° C. |
| d | 129.5 | 9.86 | Break, 173° C. |
| e | 137.0 | 11.50 | Break, 171° C. |
| f | 140.0 | 13.39 | Break, 172° C. |
| g | 111.0 | [2] 6.40 | Break, 168° C. |

[1] Compositions: a=Control, 100% Moplen; b=85% Moplen, 15% (63% ethylene/37% vinyl acetate) copolymer; c=85% Moplen, 15% (85% ethylene/15% vinyl acetate) copolymer; d=70% Moplen, 30% (80% ethylene/20% vinyl acetate) copolymer; e=70% Moplen, 15% (85% ethylene/15% vinyl acetate) copolymer, and 15% (63% ethylene/37% vinyl acetate) copolymer; f=70% Moplen, 15% (85% ethylene/15% vinyl acetate) copolymer, and 15% (56% ethylene/44% vinyl acetate) copolymer; g=50% Moplen, 50% (80% ethylene/20% vinyl acetate) copolymer.
[2] No break.

These compositions of our invention exhibit equally high physical properties when samples are evaluated from injection molded test specimens. The particular advantages of our compositions lie in the combination of excellent low temperature properties coupled with high impact strength at room temperature and with the added feature of the retained desirable high temperature properties of the isotactic polypropylene.

Example 3

The instant invention can be practiced by blending ethylene/vinyl acetate copolymer with polymers of propylene wherein a major proportion, i.e., more than 50%, of said polymer is propylene. We have found that selected properties of polymers of propylene are greatly improved by polyblending with ethylene/vinyl acetate copolymers.

A polymer of propylene consisting of 95% propylene and 5% ethylene was blended with 30% by weight, of the ultimate polyblend composition, of an 85% ethylene/15% vinyl acetate copolymer as previously described. The polyblend showed considerably improved low temperature brittleness properties compared with the original propylene/ethylene copolymer, as illustrated:

| Composition: | Low temperature brittleness property, 50% break, ° C. |
|---|---|
| Control—95% propylene/5% ethylene copolymer | −52 |
| Polyblend, 70% control, 30% (85% ethylene/15% vinyl acetate) copolymer | −71 |

In a similar manner a polyblend was prepared using a 94% propylene/6% ethylene copolymer. This polyblend was characterized as having excellent low temperature brittleness properties:

| Composition: | Low temperature brittleness property, 50% break, ° C. |
|---|---|
| Control, 94% propylene/6% ethylene copolymer | −56 |
| Polyblend, 70% control, 30% (85% ethylene/15% vinyl acetate) copolymer | −73 |

The propylene copolymers suitable for the practice of this invention can conveniently be prepared by a low pressure process as previously described. A particular advantage of our blended compositions is that the improvement in low temperature properties is achieved without sacrificing the desirable properties already possessed by the original propylene polymer.

While the invention has been described with particular reference to several preferred embodiments thereof, it will be appreciated that variations from the details given herein can be effected without departing from the invention in its broadest aspects. As has been pointed out above, the description of various procedures of polymerization, polymer blending, proportions of polymers, general properties of polymer blends, and the like given herein with particular reference to polypropylene and certain ethylene/vinyl acetate copolymers are generally applicable to all of the polymer pairs coming within the broad scope of the invention.

We claim:
1. A blend comprising from 5% to 95% by weight of a polymer chosen from the group consisting of a homopolymer of a 1-olefin having from 3 to 8 carbon atoms and a copolymer of propylene and a 1-olefin having from 4 to 8 carbon atoms wherein propylene is the major constituent and correspondingly from 95% to 5% by weight of an ethylene/vinyl acetate copolymer comprising from 95% to 65% by weight ethylene and from 5% to 35% by weight vinyl acetate.

2. A blend comprising from 5% to 95% by weight of a propylene polymer chosen from the group consisting of polypropylene, copolymers of propylene and ethylene and copolymers of propylene and a monomer chosen from the group consisting of olefins containing from 4 to 10 carbon atoms, maleic anhydride, acrylonitrile, alkyl vinyl ethers, alkyl esters of acrylic acid, and alkyl esters of methacrylic acid, said copolymers containing propylene as a major constituent and 95% to 5% by weight of an ethylene/vinyl acetate interpolymer.

3. A polymeric blend comprising from about 5% to about 95% of polypropylene and from about 95% to about 5% of a copolymer consisting of 95 to 65% ethylene with from about 5 to 35% vinyl acetate, all percentages being by weight.

4. A polyblend composition comprising from about 5 to about 95% by weight of a propylene copolymer chosen from the group consisting of polypropylene, copolymers of propylene and ethylene and copolymers of propylene and a monomer chosen from the group consisting of olefins containing from 4 to 10 carbon atoms, maleic anhydride, acrylonitrile, alkyl vinyl ethers, alkyl esters of acrylic acid, and alkyl esters of methacrylic acid, said copolymers containing propylene as a major constituent and from about 95% to 5% by weight of an ethylene/vinyl acetate copolymer comprising from 65 to 95% by weight ethylene with the balance being vinyl acetate.

5. The polyblend composition of claim 4, wherein the propylene copolymer consists of more than 50% by weight of propylene with the balance being ethylene.

6. A polyblend comprising from about 10% to about 90% by weight of a propylene polymer chosen from the group consisting of polypropylene, copolymers of propylene and ethylene and copolymers of propylene and a monomer chosen from the group consisting of olefins containing from 4 to 10 carbon atoms, maleic anhydride, acrylonitrile, alkyl vinyl ethers, alkyl esters of acrylic acid, and alkyl esters of methacrylic acid, said copolymers containing propylene as a major constituent and from about 90% to about 10% by weight of an ethylene/vinyl acetate copolymer consisting of about 90% to about 70% by weight ethylene and from about 10% to 30% by weight vinyl acetate, said polyblend being characterized as having improved low temperature brittleness properties compared with said propylene polymer component of said polyblend.

7. A composition of matter comprising an intimate limitedly-incompatible homogeneous blend of from 10 to 90 parts by weight of polypropylene and correspondingly from 90 to 10 parts by weight of an ethylene/vinyl acetate copolymer containing 65 to 95 parts by weight ethylene with the balance being vinyl acetate.

8. A rigid shock-resistant polypropylene composition characterized by a brittle temperature below 0° C. and comprised of 5 to 50 parts of an ethylene/vinyl acetate copolymer, containing 80 to 90 weight percent ethylene and correspondingly, from 20 to 10 weight percent vinyl acetate, per 100 parts of said composition.

9. A process for the preparation of polymeric compositions having improved toughness properties and improved low temperature properties compared with the polypropylene component of said composition which comprises intimately intermixing from 5% to 95% by weight of a normally solid, crystallizable polypropylene with from about 95% to 5% by weight of an ethylene/vinyl acetate copolymer consisting of 65% to 95% by weight of ethylene and correspondingly from 35% to 5% by weight of vinyl acetate.

10. A blend comprising polypropylene and an ethylene-vinyl acetate copolymer comprising a major proportion of ethylene and a minor proportion of vinyl acetate.

11. A composition comprising a uniform admixture consisting essentially of isotactic polypropylene and from about 5% to about 25% by weight of said admixture of a copolymer of ethylene and an ethylenically unsaturated ester of a saturated fatty acid.

12. Artificial fibers of improved dyeability consisting essentially of a uniform admixture of isotactic polypropylene and from about 5% to about 25% by weight of said admixture of a copolymer of ethylene and an ethylenically unsaturated ester of a saturated fatty acid.

13. Artificial fibers in accordance with claim 12 in which said copolymer has a weight ratio of ethylene to ethylenically unsaturated ester of saturated fatty acid between about 65:35 and about 85:15.

14. Artificial fibers in accordance with claim 13 in which said copolymer is a copolymer of ethylene and vinyl acetate.

15. A process for improving the dyeability of isotactic polypropylene filamentary material which comprises preparing a blend of isotactic polypropylene with from about 5% to about 25% by weight of said blend of a copolymer of ethylene and an ethylenically unsaturated ester of a saturated fatty acid, forming the blend into filamentary material, and dyeing the filamentary material.

16. A process in accordance with claim 15 in which said copolymer has a weight ratio of ethylene to unsaturated ester of saturated fatty acid between about 65:35 and about 85:15.

17. A process in accordance with claim 16 in which said copolymer is a copolymer of ethylene and vinyl acetate.

References Cited

UNITED STATES PATENTS

| 2,543,229 | 2/1951 | Chapman | 260—897 XR |
| 2,628,214 | 2/1953 | Pinkney et al. | 260—897 XR |
| 2,772,247 | 11/1956 | Schroeder | 260—897 |
| 2,944,040 | 7/1960 | Pollock et al. | 260—897 |
| 3,163,492 | 12/1964 | Thomas | 260—897 |
| 3,248,359 | 4/1966 | Maloney | 260—897 |
| 3,388,190 | 6/1968 | Bryant et al. | 260—897 |

GEORGE F. LESMES, *Primary Examiner.*

U.S. Cl. X.R.

204—159.14, 159.20; 260—897, 896, 876; 264—95

PO-1050
(5/69)

UNITED STATES PATENT OFFICE
CERTIFICATE OF CORRECTION

Patent No. 3,433,573      Dated March 18, 1969

Inventor(s) Harry P. Holladay et al

It is certified that error appears in the above-identified patent and that said Letters Patent are hereby corrected as shown below:

Column 2, line 10, for "othe" read --- the ---.

Column 2, line 15, for "isotactivity" read --- isotacticity ---.

Column 4, line 8, for "propylene" read --- polypropylene ---.

Column 4, line 39, for " $[\eta] = 1.05 \times 10\text{-}3 M_w^{0.63}$ " read --- $[\eta] = 1.05 \times 10^{-3} M_w^{0.63}$ ---.

Column 4, line 47, for "effects" read --- affects ---.

Column 5, line 39, for "amino" read --- azino ---.

SIGNED AND
SEALED
SEP 15 1970

(SEAL)
Attest:

Edward M. Fletcher, Jr.
Attesting Officer

WILLIAM E. SCHUYLER, JR.
Commissioner of Patents